*(12)* United States Patent
Lai et al.

*(10)* Patent No.: US 12,147,239 B2
*(45)* Date of Patent: Nov. 19, 2024

(54) METHOD FOR DIVIDING ROBOT AREA BASED ON BOUNDARIES, CHIP AND ROBOT

(71) Applicant: AMICRO SEMICONDUCTOR CO., LTD., Guangdong (CN)

(72) Inventors: Qinwei Lai, Guangdong (CN); Yimian Xu, Guangdong (CN); Yuelin Wang, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 48 days.

(21) Appl. No.: 17/771,471

(22) PCT Filed: Nov. 24, 2020

(86) PCT No.: PCT/CN2020/131188
§ 371 (c)(1),
(2) Date: Apr. 24, 2022

(87) PCT Pub. No.: WO2022/027869
PCT Pub. Date: Feb. 10, 2022

(65) Prior Publication Data
US 2024/0045433 A1    Feb. 8, 2024

(30) Foreign Application Priority Data
Aug. 2, 2020 (CN) .......................... 202010764284.7

(51) Int. Cl.
*G05D 1/242*    (2024.01)
*G05D 1/00*     (2006.01)
(Continued)

(52) U.S. Cl.
CPC ........... *G05D 1/0221* (2013.01); *G05D 1/024* (2013.01); *G05D 1/242* (2024.01); *G05D 1/243* (2024.01);
(Continued)

(58) Field of Classification Search
CPC ............... G05D 1/2462; G05D 1/6482; G05D 2105/10; G05D 2107/40
See application file for complete search history.

(56) References Cited

U.S. PATENT DOCUMENTS

| 10,612,929 | B2 * | 4/2020 | Afrouzi | ............... | G05D 1/0272 |
| 2015/0223659 | A1 * | 8/2015 | Han | ................... | A47L 9/2857 |
| | | | | | 134/18 |

(Continued)

FOREIGN PATENT DOCUMENTS

| CN | 104898660 A | * | 9/2015 |
| CN | 108196555 A | | 6/2018 |

(Continued)

OTHER PUBLICATIONS

CN 104898660 A—Machine translation (Year: 2015).*
CN 111127500 A—Machine translation (Year: 2020).*

*Primary Examiner* — Dino Kujundzic
(74) *Attorney, Agent, or Firm* — Samson G. Yu

(57) ABSTRACT

Disclosed are a method for dividing a robot area based on boundaries, a chip and a robot. The method includes: setting, when the robot travels along the boundaries in a preset boundary direction in an indoor working area, a reference division boundary line according to data scanned by a laser sensor of the robot in real time; and identifying, after the robot finishes traveling along the boundaries in the preset boundary direction, a door at a position of the reference division boundary line according to image characteristic information of the position of the reference division boundary line acquired by a camera of the robot, and marking the reference division boundary line on a laser map, so as to divide the indoor working area into different room subareas by means of the door.

17 Claims, 4 Drawing Sheets

(51) Int. Cl.
  *G05D 1/243* (2024.01)
  *G05D 1/246* (2024.01)
  *G05D 1/648* (2024.01)
  *G05D 105/10* (2024.01)
  *G05D 107/40* (2024.01)

(52) U.S. Cl.
  CPC ......... *G05D 1/2462* (2024.01); *G05D 1/6482* (2024.01); *G05D 2105/10* (2024.01); *G05D 2107/40* (2024.01)

(56) References Cited

U.S. PATENT DOCUMENTS

| | | | |
|---|---|---|---|
| 2019/0025838 A1* | 1/2019 | Artes | G05D 1/0246 |
| 2020/0215694 A1 | 7/2020 | Song et al. | |
| 2022/0167820 A1* | 6/2022 | Wu | G06V 20/50 |

FOREIGN PATENT DOCUMENTS

| | | | | |
|---|---|---|---|---|
| CN | 109920424 A | | 6/2019 | |
| CN | 109947109 A | | 6/2019 | |
| CN | 110269550 A | | 9/2019 | |
| CN | 110579213 A | | 12/2019 | |
| CN | 111127500 A | * | 5/2020 | ............. G06F 16/29 |
| CN | 111897334 A | | 11/2020 | |
| EP | 3674830 A1 | | 7/2020 | |
| KR | 20190094302 A | | 8/2019 | |
| WO | 2020200282 A1 | | 10/2020 | |

* cited by examiner

METHOD FOR DIVIDING ROBOT AREA BASED ON BOUNDARIES, CHIP AND ROBOT

CROSS-REFERENCE TO RELATED APPLICATION

The present disclosure claims the priority of Chinese Patent Application No. 202010764284.7, filed to the China National Intellectual Property Administration on Aug. 2, 2020 and entitled "Edgewise Path Selection Method for Robot Obstacle Crossing, Chip, and Robot", which is incorporated herein its entirety by reference.

TECHNICAL FIELD

The disclosure relates to robot cleaning area planning, in particular to a method for dividing a robot area based on boundaries, a chip and a robot.

BACKGROUND

Existing cleaning robots plan maps and navigate by means of inertial navigation, light detection and ranging or cameras. When using a cleaning robot, a user can see division of cleaning areas from a mobile device in real time. However, the cleaning areas are randomly divided into a plurality of areas only according to their coordinate information, instead of room units. Area division is mainly used for coverage planning, but at present, it's still impossible to mark the information of an uncleaned area in advance on a map constructed in real time by means of a visual technology, resulting in ineffective division of rooms.

In the prior art, in the patent for invention with the application number of 2015100760659 filed by LG Electronics Inc. in China on Feb. 12, 2015, a pure-image visual means is used to identify positions of doors and shapes of door frames, so as to distinguish rooms. However, the requirement for positions where a robot acquires images is relatively strict, and the robot is required to acquire images repeatedly at multiple angles, such that the predetermined accuracy is not easy to achieve during identifying the positions of the doors.

SUMMARY

The disclosure provides a method for dividing a robot area based on a laser. The method for dividing the robot area includes: setting, when the robot travels along the boundaries in a preset boundary direction in an indoor working area, a reference division boundary line according to data scanned by a laser sensor of the robot for dividing the indoor working area, so as to enable the robot to travel along the boundaries in the preset boundary direction according to the reference division boundary line; and identifying, after the robot finishes traveling along the boundaries in the preset boundary direction, a door at a position of the reference division boundary line according to image characteristic information of the position of the reference division boundary line acquired by a camera of the robot, and marking the reference division boundary line on a laser map, so as to divide the indoor working area into different room subareas by means of the door.

Further, a condition for the robot to finish traveling along the boundaries in the preset boundary direction is that the robot returns to a boundary starting point after traveling along the boundaries in the preset boundary direction in a traversed area, or can not set a new reference division boundary line in a process of traveling along the boundaries in the preset boundary direction in the traversed area. The reference division boundary line divides the indoor working area into the traversed area and an untraversed area, and the traversed area includes the boundary starting point and traversed paths where the robot travels along the boundaries, in the process of traveling along the boundaries in the preset boundary direction in the traversed area by the robot, one untraversed area which is new is marked out every time one reference division boundary line is set, and the robot is controlled to continue to travel along the boundaries in the preset boundary direction according to the reference division boundary line.

Further, setting the reference division boundary line according to the data scanned by the laser sensor of the robot in real time specifically includes: setting, according to the data scanned by the laser sensor of the robot in real time, a candidate boundary line meeting both a preset boundary width condition and a preset area size condition in the indoor working area, and marking the candidate boundary line as the reference division boundary line on the laser map.

Further, setting the candidate boundary line meeting both the preset boundary width condition and the preset area size condition in the indoor working area, the method further includes: using a seed filling algorithm to carry out filling on the untraversed area of the laser map, so as to fill a contour boundary surrounding the untraversed area, and recording the contour boundary which is filled as the candidate boundary line, and a scanning length of the candidate boundary line is a line segment length of the contour boundary which is filled on the laser map processed by means of the seed filling algorithm.

Further, the step of judging whether the candidate boundary line meets the preset boundary width condition includes: judging a scanning length of the candidate boundary line is greater than a first preset boundary length and less than a second preset boundary length, if the scanning length of the candidate boundary line is greater than the first preset boundary length and less than the second preset boundary length, determining that the candidate boundary line meets the preset boundary width condition, and if the scanning length of the candidate boundary line is not greater than the first preset boundary length and less than the second preset boundary length, determining that the candidate boundary line is not the reference division boundary line.

Further, the step of judging whether the candidate boundary line meets the preset area size condition includes: step 21, judging, on the laser map constructed by the robot in real time, whether an absolute value of a difference between an abscissa of an upper left most corner of a scanned and marked working area and an abscissa of a lower right most corner of the scanned and marked working area is within a preset room length range, if the absolute value of the difference between the abscissa of the upper left most corner of the scanned and marked working area and the abscissa of the lower right most corner of the scanned and marked working area is within the preset room length range, proceeding to step 22, and if the absolute value of the difference between the abscissa of the upper left most corner of the scanned and marked working area and the abscissa of the lower right most corner of the scanned and marked working area is not within the preset room length range, determining that the candidate boundary line does not meet the preset area size condition; step 22, judging whether an absolute value of a difference between an abscissa of an upper right most corner of the scanned and marked working area and an abscissa of a lower left most corner of the scanned and marked working area is within the preset room length range, if the absolute value of the difference between the abscissa of the upper right most corner of the scanned and marked working area and the abscissa of the lower left most corner of the scanned and marked working area is within the preset room length range, proceeding to step 23, and if the absolute value of the difference between the abscissa of the upper right most corner of the scanned and marked working area and the abscissa of the lower left most corner of the scanned and marked working area is not within the preset room length range, determining that the candidate boundary line does not meet the preset area size condition; step 23, judging whether an absolute value of a difference between an ordinate of the upper left most corner of the scanned and marked working area and an ordinate of the lower right most corner of the scanned and marked working area is within a preset room width range, if the absolute value of the difference between the ordinate of the upper left most corner of the scanned and marked working area and the ordinate of the lower right most corner of the scanned and marked working area is within the preset room width range, proceeding to step 24, and if the absolute value of the difference between the ordinate of the upper left most corner of the scanned and marked working area and the ordinate of the lower right most corner of the scanned and marked working area is not within the preset room width range, determining that the candidate boundary line does not meet the preset area size condition; and step 24, judging whether an absolute value of a difference between an ordinate of the upper right most corner of the scanned and marked working area and an ordinate of the lower left most corner of the scanned and marked working area is within the preset room width range, if the absolute value of the difference between the ordinate of the upper right most corner of the scanned and marked working area and the ordinate of the lower left most corner of the scanned and marked working area is within the preset room width range, determining that the candidate boundary line meets the preset area size condition, and if the absolute value of the difference between the ordinate of the upper right most corner of the scanned and marked working area and the ordinate of the lower left most corner of the scanned and marked working area is not within the preset room width range, determining that the candidate boundary line does not meet the preset area size condition.

Further, the step of identifying, after the robot finishes traveling along the boundaries in the preset boundary direction, the door at the position of the reference division boundary line according to image characteristic information of the position of the reference division boundary line acquired by the camera of the robot specifically includes: controlling, after the robot finishes traveling the boundaries in the preset boundary direction, the robot to move to preset acquisition position in front of the reference division boundary line in the traversed area; controlling the camera of the robot to acquire an image of the position of the reference division boundary line, and enabling the robot to extract two vertical lines and two horizontal line segments between the two vertical lines, and the two vertical lines intersect with the two horizontal lines to define a rectangle; and identifying the door at the reference division boundary line in combination with the two vertical lines and the two horizontal line segments, and marking the reference division boundary line as a position of the door on the laser map.

Further, the step of identifying the door at the reference division boundary line in combination with the two vertical lines and the two horizontal line segments includes: measuring a distance between the preset acquisition position and the reference division boundary line by the laser sensor; and converting, in combination with the distance between the preset acquisition position and the reference division boundary line and by means of a geometric model of camera imaging, a height of vertical line segments cut from the two vertical lines intersecting with the two horizontal line segments into an actual height, and judging whether the actual height is a preset door frame height, if the actual height is the preset door frame height, determining that the two vertical lines and the horizontal line segment arranged over the two vertical lines in a perpendicular manner correspond to a shape of a door frame, so as to determine that the robot identifies the door at the reference division boundary line; and the camera of the robot is arranged obliquely upward, such that when the robot moves to the preset acquisition position in front of the reference division boundary line, a visual angle of the camera of the robot covers an area between the reference division boundary line and a ceiling.

The disclosure provides a chip. The chip stores a computer program instruction, where when the computer program instruction is executed, the method for dividing the robot area is implemented.

The disclosure provides a robot. The robot is equipped with a laser sensor and a front camera, where the robot is internally provided with the chip, so as to implement the method for dividing the robot area by calling the laser sensor and the front camera.

DETAILED DESCRIPTION OF THE EMBODIMENTS

The technical solutions in the embodiments of the disclosure will be described in detail below with reference to the accompanying drawings in the embodiments of the disclosure. In order to further illustrate embodiments, accompanying drawings are provided in the disclosure. The accompanying drawings, which form part of the disclosed content of the disclosure, are mainly used for illustrating embodiments, and can explain, in conjunction with the description, the operation principles of the embodiments.

Figure 1:
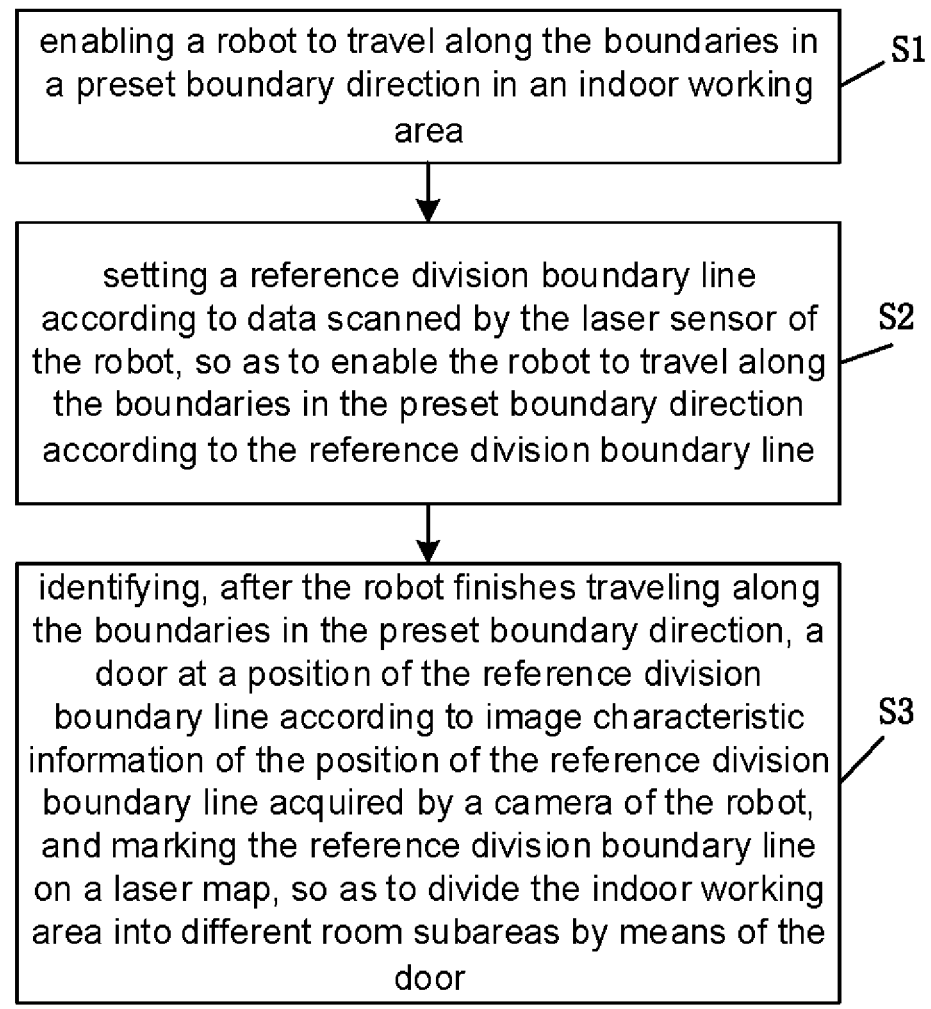
FIG. 1 is a flow diagram of a method for dividing a robot area based on boundaries disclosed in the disclosure.

An embodiment of the disclosure discloses a method for dividing a robot area based on boundaries, which is applied to a scene in which a robot travels along boundaries, and the robot can travel along boundaries in a preset boundary direction in an indoor working area. As shown in FIG. 1, The method for dividing the robot area includes: step S1, enabling a robot to travel along the boundaries in a preset boundary direction in an indoor working area, in fact, the robot travels along detected walls, and the traveling directions of the robot can be parallel to extending directions of the walls such that a laser sensor can conveniently scan an contour of the indoor working area, so as to set a boundary for preliminarily marking out subareas, and then proceeding to step S2. Step S2, setting a reference division boundary line according to data scanned by the laser sensor of the robot, the reference division boundary line matches paths where the robot has been traveled along the boundaries and environmental contours scanned in corresponding directions to define a traversed area, so as to preliminary divide the indoor working area, enabling the robot to travel along the boundaries in the preset boundary direction according to the reference division boundary line, and proceeding to step S3. Then, a new reference division boundary line can be set in a process that the robot subsequently travels along boundaries, and the robot can still travel along the boundaries in the preset boundary direction according to the new reference division boundary line in the traversed area. In the embodiment, the robot carries out scanning wherever it goes. By means of local characteristics, which are obtained by laser scanning, of room doorways on a map, an entrance of a preset room is instantly and accurately identified. A virtual wall (the reference division boundary line) is set to control the robot to travel along the entrance but does not enter the preset room until the robot moves to a new wall to travel according to the wall, such that the robot only remains in the original room to travel along boundaries. After the robot finishes traveling along the boundaries, a closed polygon is obtained, which is a relatively complete marked out room (compared with the prior art, small areas can not be combined), and then the robot carries out planning and cleaning in the marked out room, so as to dynamically and accurately clean separated rooms.

It should be noted that, in the embodiment, the reference division boundary line marks out the traversed area and an untraversed area from the indoor working area, and the untraversed area is updated and converted into a traversed area in a process that the robot travels along the boundaries in the preset boundary direction. The traversed area and the untraversed area are located on two sides of the reference division boundary line respectively, and the traversed area includes a boundary starting point of the robot and paths where the robot travels along the boundaries, and the reference division boundary line is marked on a laser map. The untraversed area is an area where the robot does not travel but can be detected by means of laser scanning, and then the untraversed area is subjected to seed filling processing to obtain area contour boundary information and is marked as a room subarea such that the robot can conveniently assign room area cleaning tasks.

Therefore, in the process that the robot travels along the boundaries in the preset boundary direction, every time a reference division boundary line is set, the robot is controlled to continue to travel along boundaries in a preset boundary direction according to the reference division boundary line until a new wall is detected in the same room area, and then the robot continues to travel along the boundaries in the preset boundary direction according to the new wall. The robot keeps parallel to the wall, and the wall is also marked as part of a traversed area. The traversed area includes a boundary starting point and traversed paths where the robot travels along the boundaries, and is determined after the robot finishes traveling along the boundaries in the preset boundary direction, that is, a closed polygon area is determined when the robot returns to the boundary starting point after traveling along the boundaries. The closed polygon area is marked as the traversed area on a laser map, and a new untraversed area is marked out in the indoor working area such that the robot can be conveniently controlled to mark out new room subareas in a plurality of directions in a process of traveling along the same boundary direction, thereby making a coverage rate of area division of the robot higher. When the robot returns to the boundary starting point after traveling along the boundaries in the preset boundary direction in the traversed area, or can not set a new reference division boundary line in a process of traveling along the boundaries in the preset boundary direction in the traversed area, the robot finishes traveling along the boundaries in the traversed area. In order to prevent the robot from endlessly traveling along the boundaries, a reasonable reference division boundary line is set, so as to make area division more reasonable.

Figure 3:
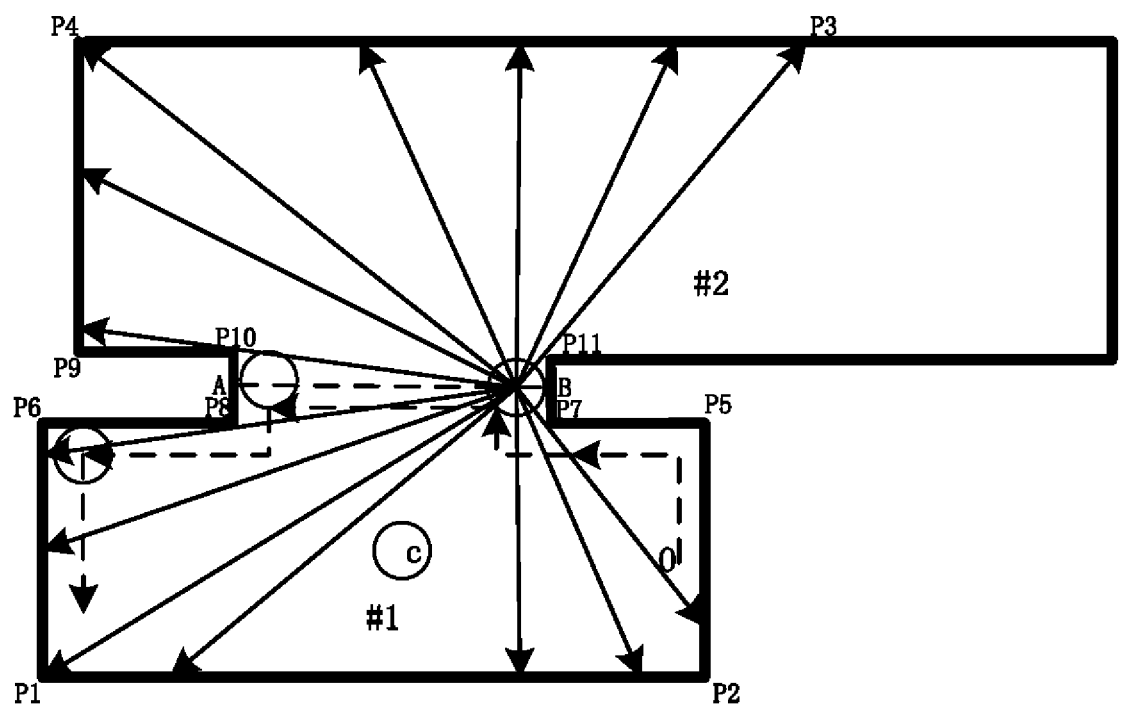
FIG. 3 is a schematic diagram of setting a reference division boundary line in an indoor working area by means of laser scanning by a robot disclosed in an embodiment of the disclosure.
Figure 4:
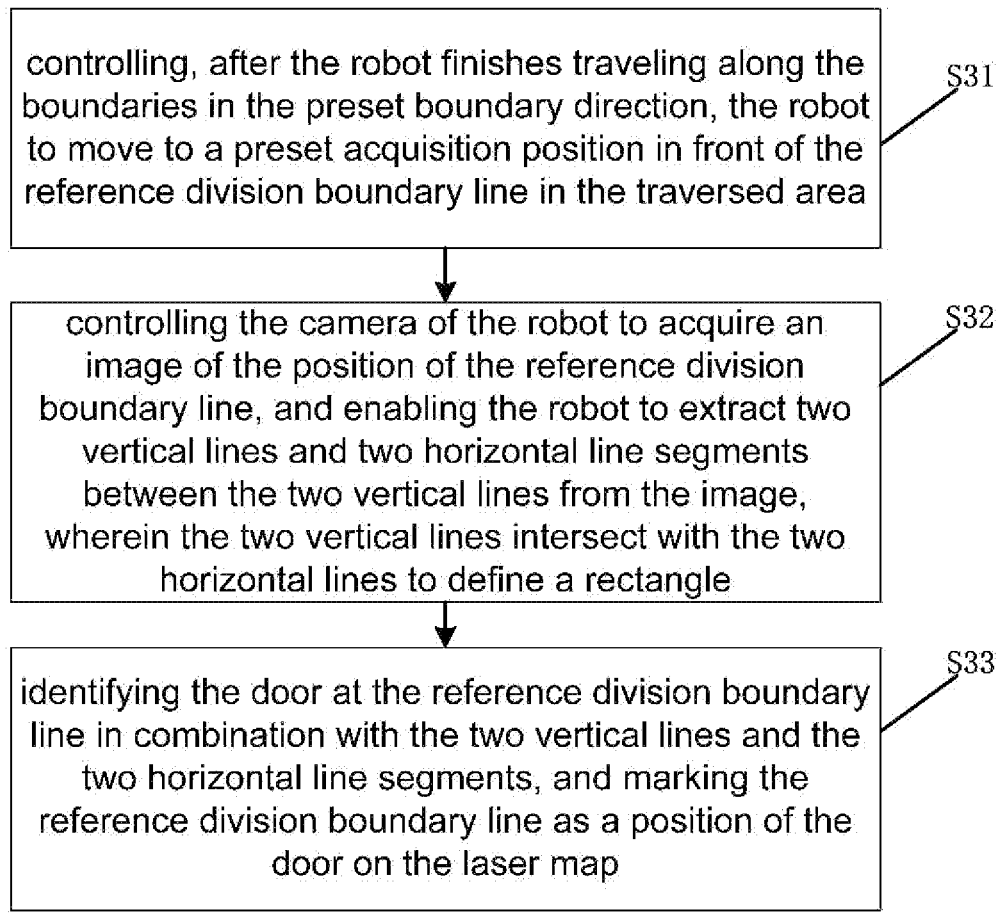
FIG. 4 is a flow diagram of a method for identifying a door at a position of a reference division boundary line according to image characteristic lines by a robot.

For the convenience of understanding, in a process that the robot in FIG. 3 disclosed in the embodiment starts to travel counterclockwise along the boundaries in a semiclosed area #1 with only one opening, a reference division boundary line is set only at a position B, so as to distinguish the area #1, which is a traversed area and an area #2, which is an untraversed area, and then the robot is limited to continue to travel counterclockwise along the boundaries in the traversed area #1 until the robot returns to a boundary starting point O. As shown in FIG. 3, the robot (a circle close to a boundary of an indoor working area in FIG. 3) starts from the boundary starting point O, traverses a boundary P2P5, a boundary P5P7, a boundary P7B, a boundary line BA, a boundary APB, a boundary P8P6, a boundary P6P1 and a boundary P1P2 of the indoor working area counterclockwise in sequence along the boundaries, and then returns to the boundary starting point O along the boundary P2P5 to form boundary paths shown by dotted arrows in FIG. 3. in a process that the robot shown in FIG. 3 travels along the boundaries, a laser sensor rotationally emits laser light (rays with arrows radiating to a periphery by taking a circle close to the position B in FIG. 3 as a center) such that most boundary and corner contours of the traversed area #1 in FIG. 3 can be covered, and most boundary and corner contours of the untraversed area #2 in FIG. 3 can be scanned and covered, so as to scan and mark a large amount of environmental boundary information for the laser map constructed by the robot in real time. On this basis, according to data scanned by the laser sensor of the robot in real time, a reference division boundary line is set in the indoor working area, such that the reference division boundary line divides the indoor working area into the subarea #1 and the subarea #2, and the subarea is marked out according to a width characteristic meeting a passable requirement of a door and a size of the whole room area. As shown in FIG. 3, a dotted line BA is set as a reference division boundary line, the reference division boundary line and the boundary AP8, the boundary P8P6, the boundary P6P1, the boundary P1P2, the boundary P2P5, the boundary P5P7 and the boundary P7B define a closed subarea #1, and the robot can travel along the boundaries in a preset boundary direction (corresponding to a counterclockwise direction of FIG. 3) only according to the reference division boundary line (the dotted line BA in FIG. 3) in the original room area. Since if the robot continues to travel along boundaries to enter the subarea #2, that is, to cross an entrance of the subarea #2 (the dotted line BA in FIG. 3), configuration requirements of a system for scanning a constructed closed area are not met. It should be noted that the preset boundary direction can also be clockwise, which varies with a position of the boundary starting point.

Step S3, identifying, after the robot finishes traveling along the boundaries in the preset boundary direction, a door at a position of the reference division boundary line according to image characteristic information of the position of the reference division boundary line acquired by a camera of the robot, and marking the reference division boundary line on a laser map, so as to divide the indoor working area into different room subareas by means of the door. Preferentially, after the robot returns to the boundary starting point after traveling along the boundaries in the preset boundary direction, or can not set a new reference division boundary line in a process of traveling along the boundaries in the preset boundary direction, a behavior executed by the robot can be a pre-configured instruction, such as the instruction of controlling the robot to start executing a cleaning task in a current traversed area (corresponding to the traversed area #1 in FIG. 3) where a robot travels along the boundaries. Since the laser sensor of the robot scans and marks room area information in a process that the robot travels along the boundaries and a cleaning task instruction is generated at the moment when the robot finishes traveling along the boundaries. Then the robot carries out, according to the cleaning task instruction, cleaning in the traversed area where the robot travels along the boundaries, and the robot photograph an image while carrying out cleaning. When the robot cleans to a preset position, the camera of the robot is controlled to acquire an image at the reference division boundary line, and a visual angle of the camera can at least cover an area between a wall where the reference division boundary line is and the ceiling. Then the door is identified and determined according to characteristic lines of the image, and when the door is identified at the reference division boundary line, the reference division boundary line is marked on the laser map, such that the door eventually divides the indoor working area into different room subareas.

Compared with the prior art, the embodiment of the disclosure sets, by means of laser data, the reference division boundary line for positioning a door position and for serving as a candidate door position, so as to preliminarily divide the indoor working area, and then identifies, in combination with image information at the reference division boundary line, a real door in the preliminary marked out subareas. A multi-dimensional combination mode that the method for dividing the robot area disclosed in the disclosure uses plane boundary information obtained by means of laser scanning and the camera to acquire and process characteristic lines of a door frame above the horizontal ground has higher identification accuracy for a room door than a pure visual technology.

On the basis of the above embodiments, in the embodiment of the disclosure, the step of setting, in a process that the robot travels along the boundaries in the indoor working area, the reference division boundary line according to the data scanned by the laser sensor of the robot in real time specifically includes: setting, according to data scanned by the laser sensor of the robot in real time, a candidate boundary line meeting both a preset boundary width condition and a preset area size condition in the indoor working area, and marking the candidate boundary line as the reference division boundary line on the laser map, such that the reference division boundary line preliminarily divides the indoor working area into the traversed area and the untraversed area. The traversed area and the untraversed area are located on two sides of the reference division boundary line respectively, and the traversed area includes a boundary starting point and traversed paths where the robot travels along the boundaries. It should be noted that the embodiment of the disclosure does not limit the determination order of the preset boundary width condition and the preset area size condition. According to the embodiment, the candidate boundary line capable of determining the door is determined according to a size of a real room area and trafficability of a door between rooms, and the candidate boundary line serves as a candidate door position, so as to improve door identification accuracy.

Figure 2:
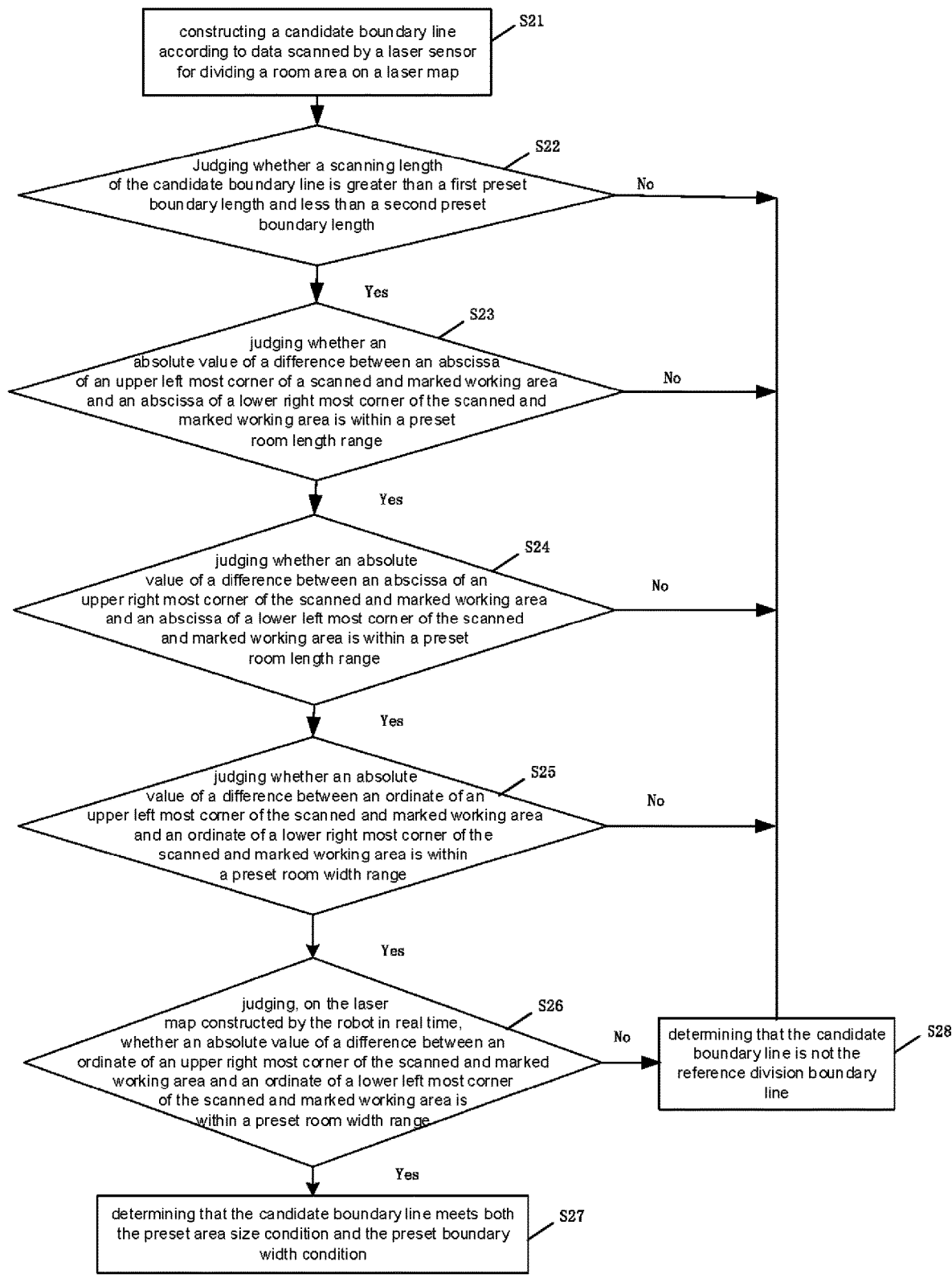
FIG. 2 is a flow diagram of the step for setting a candidate boundary line meeting both a preset boundary width condition and a preset area size condition by a robot disclosed in an embodiment of the disclosure.

As one embodiment, in combination with the preset boundary width condition and the preset area size condition, a flow diagram of the step for setting a candidate boundary line meeting both a preset boundary width condition and a preset area size condition by a robot, as shown in FIG. 2 includes:

Step S21, constructing a laser map according to area information acquired by the laser sensor of the robot at different positions and different angles, and the embodiment can not directly use the data acquired in real time by the laser sensor; selecting a laser line segment from the laser map, and enable the laser line segment to become a candidate boundary line for dividing a room area, which can be a candidate boundary line scanned by the robot at a current boundary position; and proceeding to step S22. It should be noted that the laser map is a map processed by means of a seed filling algorithm, and a boundary which can define an contour of the map and is obtained by means of seed filling is used as the candidate boundary line, so as to prevent mistaken determination caused by isolated obstacles on the laser map.

As shown in FIG. 3, when the robot travels along the boundaries to a position close to a position B, that is, when the robot travels along the boundaries to a position emitting laser light to a periphery in FIG. 3, a plurality of candidate boundary lines can be selected. In FIG. 3, the position B, a position A, a position P1, a position P3 and a position P4 can all be used as boundary and corner position points of an environment contour scanned by the laser sensor and constructed on the laser map, and connecting lines of the scanned boundary and corner position points can be used as candidate boundary lines and are colored boundaries obtained by means of the seed filling algorithm, such that the dotted line AB in FIG. 3 is regarded as the candidate boundary line. The candidate boundary lines can be walls, or directly together with walls, so as to reserve spaces for the walls, and further to conveniently divide the room area subsequently.

Step S22, judging whether the candidate boundary line meets the preset boundary width condition specifically includes: judging whether a scanning length of the candidate boundary line is greater than a first preset boundary length and less than a second preset boundary length, if yes, determining that the candidate boundary line meets the preset boundary width condition and proceeding to step S23, and otherwise, proceeding to step S28 and determine that the candidate boundary line does not meet the preset boundary width condition. The first preset boundary length is a threshold for determining aisle widths of the room area, and the aisle widths of the room area includes: a small-gap channel width and a small distance between table legs or chair legs in the same room area, the candidate boundary lines having the small scanning length can not be used for preliminarily marking out new room areas, and further doors can not be identified on the candidate boundary lines. The second preset boundary length is a threshold for determining a corridor width, and the corridor width and a gallery area scanned and measured by the robot in a process of traveling along the boundaries (along the walls) are relatively large, such that the set second preset boundary length is greater than the first preset boundary length and a width of a general door. The candidate boundary lines having the relatively large scanning length can not be set as room entrances and can not be used for marking out new room areas. According to the embodiment, the candidate boundary line is limited in a range meeting a door width requirement, so as to prevent a corridor and a small-gap passage in the indoor working area from being subjected to division of the room area, and to make division of room area more reasonable.

Step S23, judging, on the laser map constructed by the robot in real time, whether the candidate boundary line meets the preset area size condition, specifically includes: judging whether an absolute value of a difference between an abscissa of an upper left most corner of a scanned and marked working area and an abscissa of a lower right most corner of the scanned and marked working area is within a preset room length range, if yes, proceeding to step S24, and otherwise, proceeding to step S28. Step S23 is used for judging whether a working area scanned and marked by the laser sensor on the laser map has a length reaching a basic length (within a preset room length range) allowed for forming a room, so as to prevent the situation that reference division boundary lines are set under furniture such as a table, a chair, a bed or a sofa to preliminarily mark out room subareas. As shown in FIG. 3, when the robot travels along the boundaries to be close to the position B (which can be regarded that the robot is at the position B), an upper left most corner P4 of the working area is scanned by the robot and an abscissa thereof is marked on the laser map, meanwhile, a lower right most corner P2 of the working area is scanned by the robot and an abscissa thereof is marked on the laser map, and then computation is carried out to determine whether an absolute value of a difference between the abscissa of the upper left most corner P4 and the abscissa of the lower right most corner P2 is within the preset room length range.

Step S24, judging, on the laser map constructed by the robot in real time, whether an absolute value of a difference between an abscissa of an upper right most corner of the scanned and marked working area and an abscissa of a lower left most corner of the scanned and marked working area is within a preset room length range, if yes, proceeding to step S25, and otherwise, proceeding to step S28. Compared with step S23, step S24 determines from another symmetrical orientation whether the working area scanned and marked on the laser map by the laser sensor has a length reaching the basic length (within the preset room length range) allowed for forming a room, so as to more comprehensively prevent the situation that reference division boundary lines are set under furniture such as a table, a chair, a bed or a sofa to preliminarily mark out room subareas. As shown in FIG. 3, when the robot travels along the boundaries to be close to the position B (which can be regarded that the robot is at the position B), an upper right most corner P3 of the working area is scanned by the robot and an abscissa thereof is marked on the laser map, meanwhile, a lower left most corner P1 of the working area is scanned by the robot and an abscissa thereof is marked on the laser map, and then computation is carried out to determine whether an absolute value of a difference between the abscissa of the upper left most corner P3 and the abscissa of the lower right most corner P1 is within the preset room length range.

Step S25, judging, on the laser map constructed by the robot in real time, whether an absolute value of a difference between an ordinate of an upper left most corner of the scanned and marked working area and an ordinate of a lower right most corner of the scanned and marked working area is within a preset room width range, if yes, proceeding to step S26, and otherwise, proceeding to step S28. Step S26 is used for judging whether a working area scanned and marked on the laser map by the laser sensor has a width reaching a basic width (within a preset room width range) allowed for forming a room, so as to prevent the situation that reference division boundary lines are set under furniture such as a table, a chair, a bed or a sofa to preliminarily mark out room subareas. As shown in FIG. 3, when the robot travels along the boundaries to be close to the position B (which can be regarded that the robot is at the position B), an upper left most corner P4 of the working area is scanned by the robot and an ordinate thereof is marked on the laser map, meanwhile, a lower right most corner P2 of the working area is scanned by the robot and an ordinate thereof is marked on the laser map, and then computation is carried out to determine whether an absolute value of a difference between the ordinate of the upper left most corner P4 and the ordinate of the lower right most corner P2 is within the preset room width range.

Step S26, judging, on the laser map constructed by the robot in real time, whether an absolute value of a difference between an ordinate of an upper right most corner of the scanned and marked working area and an ordinate of a lower left most corner of the scanned and marked working area is within a preset room width range, if yes, proceeding to step S27, and otherwise, proceeding to step S28. Compared with step S26, step S25 determines from another symmetrical orientation whether the working area scanned and marked on the laser map by the laser sensor has a length reaching the basic width (within the preset room width range) allowed for forming a room, so as to more comprehensively prevent the situation that reference division boundary lines are set under furniture such as a table, a chair, a bed or a sofa to preliminarily mark out room subareas. As shown in FIG. 3, when the robot travels along the boundaries to be close to the position B (which can be regarded that the robot is at the position B), an upper right most corner P3 of the working area is scanned by the robot and an ordinate thereof is marked on the laser map, meanwhile, a lower left most corner P1 of the working area is scanned by the robot and an ordinate thereof is marked on the laser map, and then computation is carried out to determine whether an absolute value of a difference between the ordinate of the upper right most corner P3 and the ordinate of the lower left most corner P1 is within the preset room width range.

In the above steps S21 to S26, the step of setting the candidate boundary line meeting both the preset boundary width condition and the preset area size condition in the indoor working area includes: judging whether the candidate boundary line meets the preset boundary width condition;

and then judging whether the candidate boundary line meets the preset area size condition on the basis that the candidate boundary line meets the preset boundary width condition. Trafficability of the boundary is determined first, and then whether the area where the boundary is located has a size for forming a room is determined. The abscissa and ordinate of the upper left most corner of the scanned and marked working area, the abscissa and ordinate of the lower left most corner of the scanned and marked working area, the abscissa and ordinate of the upper right most corner of the scanned and marked working area, and the abscissa and ordinate of the lower right most corner of the scanned and marked working area are all coordinate parameters marked on the laser map according to data scanned by the laser sensor of the robot in real time, the selected coordinate parameters are used for comprehensively representing size information of a large room area, and for judging whether the size information of the large area defined on the basis of the coordinate parameters is within a normal parameter range. The order of the step of judging whether the candidate boundary line meets the preset area size condition in steps S23 to S26 and the step of judging whether the candidate boundary line meets the preset boundary width condition in step S22 can be reversed.

It should be noted that, as shown in FIG. 3, the scanned and marked working area in the previous step is part of the indoor working area, and when the robot move along the boundaries to be close to the position B, laser light emitted by the laser sensor can cover boundary and corner positions P9, P10 and P11 of the untraversed area #2. However, part of the untraversed area #2 is still not scanned by and covered with the laser light, and will be cleaned after the robot finishes cleaning the traversed area #1.

Step S27, determining that the candidate boundary line meets both the preset area size condition and the preset boundary width condition, and marking the candidate boundary line as the reference division boundary line, so as to preliminary divide the indoor working area, and further take, in combination with visual identity, the candidate boundary line as the candidate position of a door.

Step S28, determining that the candidate boundary line is not the reference division boundary line. A condition of implementation from step S22 to step S28 is that the candidate boundary line does not meet the preset boundary width condition, and a condition of implementation from the other steps to step S28 is that the candidate boundary line does not meet the preset area size condition.

According to the method for dividing the robot area described in steps S21 to S28, the candidate boundary line preliminary marks out subareas in the indoor working area having a normal passable size, so as to prevent the robot from marking out the room subareas under relatively low furniture. A door is required to be identified at the reference division boundary line, so as to truly mark out the room subareas.

Before setting the candidate boundary line meeting both the preset boundary width condition and the preset area size condition in the indoor working area, that is, before the method for dividing the robot area described in steps S21 to S28 is implemented, the following steps are required to be implemented: using a seed filling algorithm to carry out filling on the untraversed area of the constructed laser map, specifically, when a gray value of a grid in the untraversed area is detected to be 128, filling the grid with a red color (not shown in the figure) and marking the grid as an contour grid of the untraversed area, and stopping filling until the untraversed area is completely subjected to filling, such that grids of an contour of the untraversed area are all filled with red colors. The filled contour defines a closed polygon area, or the filled contour is connected to an contour of the traversed area to define a closed polygon area, and the closed polygon area can define the untraversed area. In this way, an isolated grid having a gray value of 128 is in the area defined by the contour of the untraversed area, which is an isolated obstacle likely to be determined as a map boundary by mistake. Therefore, the candidate boundary line is only selected from the filled contour in the untraversed area, and the filled contour is recorded as the candidate boundary line, such that the isolated obstacle which is likely to be determined as a map boundary by mistake is filtered before room subareas are marked out, so as to prevent subsequent mistaken determination of the reference division boundary line, and further to improve division accuracy of the indoor working areas. The candidate boundary line in the above embodiments has a scanning length equal to a line segment length of the contour boundary which is filled on the laser map processed by means of the seed filling algorithm.

It should be noted that, in a process of using the seed filling algorithm to carry out filling on the untraversed area of the constructed laser map, on the laser map disclosed in the embodiment of the disclosure, the gray value of the grid on the map boundary (including the boundary line for dividing the area set subsequently) is set to be a specific gray value of 128, a gray value of an idle grid on the laser map is set to be greater than 128, and a gray value of a grid marking the obstacle on the laser map is set to be less than 128. When it is detected that the gray value of the grid is not equal to 128, the grid is not filled and marked with 1, and otherwise the grid is filled and marked with 0.

As one embodiment, the step of identifying, after the robot finishes traveling along the boundaries in the preset boundary direction, a door at a position of the reference division boundary line according to image characteristic information of the position of the reference division boundary line acquired by a camera of the robot specifically includes:

In step S31, in the above embodiments, the reference division boundary line is set in the indoor working area, the robot travels along the boundaries counterclockwise in a closed subarea #1 defined by the reference division boundary line BA, a boundary P2P5, a boundary P5P7, a boundary P7B, a boundary AP8, a boundary P8P6, a boundary P6P1 and a boundary P1 P2, and in this way, the closed subarea #1 is marked as the traversed area by means of the reference division boundary line BA. After the robot finishes traveling along the boundaries in the preset boundary direction, the robot is controlled to move to a position in front of the reference division boundary line in the traversed area. As shown in FIG. 3, the robot can move to a preset acquisition position c at a preset distance in front of the reference division boundary line while acquiring image information, and then proceeding to step S32.

Step S32, controlling the camera of the robot to acquire an image of the position of the reference division boundary line, and enabling the robot to extract two vertical lines and two horizontal line segments between the two vertical lines, and the two vertical lines intersect with the two horizontal lines to define a rectangle. Specifically, controlling the camera of the robot to acquire an image of the position of the reference division boundary line, and enabling the robot to extract two oblique lines and two horizontal line segments between the two oblique lines, and the two horizontal line segments are located at upper ends and lower ends of the two oblique lines respectively. The extracted two oblique lines are connected to two ends of the two horizontal line segments respectively, and the two oblique lines intersect with the two horizontal lines to define a quadrangle. The two oblique lines are converted into two vertical lines which are perpendicular to the two horizontal line segments respectively by means of a preset image coordinate transformation relation, where the preset image coordinate transformation relation is really simple calibration of space points on a plane where the door is positioned and points on image pixels, such that a quadrangle (possibly caused by a photographing visual angle) defined by the oblique lines and the horizontal lines on the image is corrected into a rectangle of a real door. The two vertical lines obtained by means of transformation on the basis of the preset image coordinate transformation relation are perpendicularly arranged below one horizontal line segment, and the two vertical lines are perpendicularly arranged above the other horizontal line segment, such that the two vertical lines intersect with the two horizontal lines to define a rectangle. Then, the robot proceeding to step S33; image information acquired by the camera of the robot in step S32 can include a wall, a door frame, a sill, a side wall and a front wall between a ceiling above the reference division boundary line and a door frame, and then characteristic lines representing a shape of a door are extracted from the image. Although the image information can vary as a position of the robot changes, it should be specifically noted that the horizontal line segments extracted from the image can really match the reference division boundary line in the indoor working area.

Step S33, identifying the door at the reference division boundary line in combination with the two vertical lines and the two horizontal line segments, and marking the reference division boundary line as a position of the door on the laser map. Specifically, if the two oblique lines described in step S32 are transformed into the two vertical lines perpendicular to the two horizontal line segments described in step S32 respectively by means of the preset image coordinate transformation relation, the vertical lines obtained on the basis of the preset image coordinate transformation relation are merely line segments existing in the image, and lengths of real objects corresponding to the vertical lines is required to be judged to determine whether the vertical lines correspond to a plurality of vertical lines on the boundaries between the ceiling, the front wall and the side wall formed in the indoor working area and the vertical lines formed by the door frame, so as to prevent the problem of mistaken determination of the door frame. When the acquired height of the real object corresponding to the vertical lines meets the height of the real door frame, the shape of the door frame corresponding to the two horizontal line segments and the two vertical lines perpendicular thereto is determined, and further it is determined that the robot identifies the door at the reference division boundary line.

An inclination angle of an orientation of the camera has a mapping relation with the preset image coordinate transformation relation, that is, the preset image coordinate transformation relation is used for transforming the two oblique lines in the image acquired by the camera at position at a preset distance in front of the reference division boundary line into two vertical lines perpendicular to the horizontal line segments in step S32 respectively. The larger the inclination angle of the orientation of the camera relative to the ground plane is, the larger the inclination angle of the oblique lines representing the door frame at the reference division boundary line in the image acquired by the camera relative to a vertical direction is, and the more obvious a transformation effect exerted by the preset image coordinate transformation relation. In the step, the two oblique lines are determined by transformation to determine whether the two oblique lines and one horizontal line segment between the two vertical lines in the image at the position of the reference division boundary line can be identified as a door which is formed by combining the vertical lines and the horizontal lines, so as to simplify door identification steps and to improve door identification accuracy.

By implementing steps S31 to S33, in the embodiment, the door is identified according to a size of complete characteristic lines in the single image on the basis of determining the reference division boundary line by means of laser scanning, and the robot is not required to generate a lot of image information at multiple angles or positions. Door identification accuracy can be ensured, and a computation amount of visual processing is reduced. Compared with the prior art, the embodiment does not use image information acquired by the camera to position the door, since the embodiment uses the reference division boundary line set by means of the laser data to preliminary divide the area and determine the candidate position (that is, the reference division boundary line) of the door in the above embodiment, the robot only carries out acquisition and processing to determine whether characteristic lines at the position of the reference division boundary line conform to the shape of the door frame, so as to identify the door but the door is not be positioned by means of image information. Therefore, a plurality of images acquired at different angles relative to the robot do not required to be processed and a load of visual computing is reduced.

Specifically, the step of identifying the door at the reference division boundary line in combination with the two vertical lines and the two horizontal line segments includes:
first measuring a distance between a preset acquisition position and the reference division boundary line by a laser sensor, and image information of the reference division boundary line acquired at the preset acquisition position meets a basic visual effect requirement for identifying the door frame, that is, acquiring and extracting relatively complete vertical line segments and horizontal line segments which are intersect, so as to describe a basic door frame shape, but the vertical line segments and the horizontal line segments can also be a shape of a bed bottom and a table bottom, mistaken determination is likely to occur by identifying the door frame by simply relying on the vertical line segments and horizontal line segments which intersect, such that the actual height of the object corresponding to the vertical line segments extracted from the image is further determined, and a width problem of the door frame is determined after the reference division boundary line is set in the previous step. In the embodiment, in order to obtain the actual height of the object corresponding to the vertical line segments, in combination with a focal length of the camera and a distance between the preset acquisition position scanned by the laser sensor and the reference division boundary line, a geometric model of camera imaging is constructed, so as to carry out proportional computing to obtain height information of the real object corresponding to the vertical line segments. It should be noted that depth information of the reference division boundary line, that is, a distance between the preset acquisition position and the reference division boundary line, can not be obtained from a single image. Therefore, in the embodiment, the distance between the preset acquisition position and the reference division boundary line can only be scanned by the laser sensor of the robot located at the preset acquisition position.

Then converting, in combination with the distance between the preset acquisition position and the reference division boundary line and by means of the geometric model of camera imaging, heights of the vertical line segments cut from the two vertical lines intersecting with the two horizontal line segments into an actual heights. This conversion step is actually to substitute the distance between the preset acquisition position and the reference division boundary line, the focal length of the camera and the height of the vertical line segment into a similar triangular proportional relation arranged in the geometric model (pinhole imaging model) of camera imaging, so as to convert a height of the vertical line segment into an actual height. Whether the actual height is equal to a preset door frame height is determined, if yes, it is determined that the two vertical lines and the horizontal line segments arranged on the two vertical lines in a perpendicular manner correspond to a shape of a door frame, so as to determine that the robot identifies the door at the reference division boundary line. The camera of the robot is arranged obliquely upward, such that when the robot moves to the preset acquisition position in front of the reference division boundary line, a visual angle of the camera of the robot covers an area between the reference division boundary line and a ceiling.

In the embodiment, there is an opening AB in the traversed area #1 of FIG. 3, such that only one reference division boundary line AB is set in step S2, and the robot is only required to acquire, at the preset acquisition position c, a door frame line shape image at the position of the reference division boundary line AB once. The camera is arranged at a front end of a robot body, the camera of the robot faces obliquely upward, an included angle between an optical axis of the camera and a horizontal plane is 45 degrees, and the camera is used for acquiring image information on the ground in an advancing direction, such that when the robot moves to a position at a preset distance in front of the reference division boundary line, the visual angle of the camera of the robot covers the area between the reference division boundary line and the ceiling. In the embodiment, a single camera can be arranged and can keep photographing while implementing a cleaning task.

After the robot identifies the door at the reference division boundary line, the position of the door is marked as an entrance of the corresponding room subarea on the laser map, such that the indoor working area is divided into different room subareas, and meanwhile, the different room subareas are marked on the laser map. In the indoor working area in FIG. 3, the robot identifies that the door exists at the reference division boundary line AB in the traversed area #1, the indoor working area is divided into the room subarea #1 and the room subarea #2 by taking the reference division boundary line AB as a boundary, which is a result determined on the basis of steps S21 to S28, and finally the indoor working area is divided into different room subareas. After the robot finishes the cleaning task of the room subarea #1, the robot crosses the reference division boundary line AB to proceed to the room subarea #2, then starts to travel along boundaries in a preset boundary direction in the room subarea #2, then starts to clean the room subarea after finishing traveling along the boundaries according to the above method steps and implements steps 1 to 3 to mark out a new room subarea, which can be a new marked out room subarea in a untraversed area of the room subarea #2 which is not scanned by the laser sensor of the robot close to position B, but the robot does not return to the room subarea which is cleaned and traversed. Specifically, the reference division boundary line is set by repeatedly implementing the method for dividing the robot area to mark out a new subarea, and the robot is controlled to finish covering cleaning in the corresponding subarea, such that the covering cleaning of the indoor working area is finished by marking out the room subareas. According to the embodiment, different room subareas are marked out by means of the identified door, such that the robot can finish cleaning the rooms in sequence according to the marked out room subareas, and the robot can not proceed to and exit two adjacent room subareas at will in a process of executing the cleaning task, thereby realizing intelligent cleaning.

The disclosure provides a chip. The chip stores a computer program instruction, and when the computer program instruction is executed, the method for dividing the robot area is implemented. Accuracy of identifying the doors can be ensured, and a visual processing computation amount is reduced.

The disclosure provides a robot. The robot is equipped with a laser sensor and a front camera, and the robot is internally provided with the chip above, so as to implement the method for dividing the robot area by calling the laser sensor and the front camera. The defect that a vision camera can not acquire contour information of an untraversed area in advance is overcome. The robot disclosed in the embodiment of the disclosure sets, by means of laser data, the reference division boundary line for positioning a door position and for serving as a candidate door position, so as to preliminarily divide the indoor working area, and then identifies, in combination with image information at the reference division boundary line, a real door in the preliminary marked out subareas. A multi-dimensional combination mode that the method for dividing the robot area disclosed in the disclosure uses plane boundary information obtained by means of laser scanning and the camera to acquire and process characteristic lines of a door frame above the horizontal ground has higher identification accuracy for a room door than a pure visual technology.

The above embodiments are merely illustrative of the technical concepts and features of the disclosure, and are intended to enable those skilled in the art to understand and practice the content of the disclosure, without limiting the scope of protection of the disclosure. All equivalent variations or modifications made in accordance with the spiritual essence of the disclosure should fall within the scope of protection of the disclosure.

What is claimed is:

1. A method for dividing a robot area based on boundaries, comprising:
　　setting, when the robot travels along the boundaries in a preset boundary direction in an indoor working area, a reference division boundary line according to data scanned by a laser sensor of the robot for dividing the indoor working area, so as to enable the robot to travel along the boundaries in the preset boundary direction according to the reference division boundary line; and
　　identifying, after the robot finishes traveling along the boundaries in the preset boundary direction, a door at a position of the reference division boundary line according to image characteristic information of the position of the reference division boundary line acquired by a camera of the robot, and marking the reference division boundary line on a laser map, so as to divide the indoor working area into different room subareas by means of the door, wherein a condition for the robot to finish traveling along the boundaries in the preset boundary direction is that the robot returns to a boundary starting point after traveling along the boundaries in the preset boundary direction in a traversed area, or the robot cannot set a new reference division boundary line in a process of traveling along the boundaries in the preset boundary direction in the traversed area;

the reference division boundary line divides the indoor working area into the traversed area and an untraversed area and the traversed area comprises the boundary starting point and traversed paths where the robot travels along the boundaries; and in the process of traveling along the boundaries in the preset boundary direction in the traversed area by the robot, one untraversed area which is new is marked out every time one reference division boundary line is set, and the robot is controlled to continue to travel along the boundaries in the preset boundary direction according to the reference division boundary line.

2. The method for dividing the robot area according to claim 1, wherein setting the reference division boundary line according to the data scanned by the laser sensor of the robot in real time specifically comprises:

setting, according to the data scanned by the laser sensor of the robot, a candidate boundary line meeting both a preset boundary width condition and a preset area size condition in the indoor working area, and marking the candidate boundary line as the reference division boundary line on the laser map.

3. The method for dividing the robot area according to claim 2, wherein before setting the candidate boundary line meeting both the preset boundary width condition and the preset area size condition in the indoor working area, the method further comprises:

using a seed filling algorithm to carry out filling on the untraversed area of the laser map, so as to fill a contour boundary surrounding the untraversed area, and recording the contour boundary which is filled as the candidate boundary line, wherein a scanning length of the candidate boundary line is a line segment length of the contour boundary which is filled on the laser map processed by means of the seed filling algorithm.

4. The method for dividing the robot area according to claim 3, wherein judging whether the candidate boundary line meets the preset boundary width condition comprises:

judging whether a scanning length of the candidate boundary line is greater than a first preset boundary length and less than a second preset boundary length, if the scanning length of the candidate boundary line is greater than the first preset boundary length and less than the second preset boundary length, determining that the candidate boundary line meets the preset boundary width condition, and if the scanning length of the candidate boundary line is not greater than the first preset boundary length and less than the second preset boundary length, determining that the candidate boundary line is not the reference division boundary line.

5. The method for dividing the robot area according to claim 3, wherein judging whether the candidate boundary line meets the preset area size condition comprises:

step 21, judging, on the laser map constructed by the robot in real time, whether an absolute value of a difference between an abscissa of an upper left most corner of a scanned and marked working area and an abscissa of a lower right most corner of the scanned and marked working area is within a preset room length range, if the absolute value of the difference between the abscissa of the upper left most corner of the scanned and marked working area and the abscissa of the lower right most corner of the scanned and marked working area is within the preset room length range, proceeding to step 22, and if the absolute value of the difference between the abscissa of the upper left most corner of the scanned and marked working area and the abscissa of the lower right most corner of the scanned and marked working area is not within the preset room length range, determining that the candidate boundary line does not meet the preset area size condition;

step 22, judging whether an absolute value of a difference between an abscissa of an upper right most corner of the scanned and marked working area and an abscissa of a lower left most corner of the scanned and marked working area is within the preset room length range, if the absolute value of the difference between the abscissa of the upper right most corner of the scanned and marked working area and the abscissa of the lower left most corner of the scanned and marked working area is within the preset room length range, proceeding to step 23, and if the absolute value of the difference between the abscissa of the upper right most corner of the scanned and marked working area and the abscissa of the lower left most corner of the scanned and marked working area is not within the preset room length range, determining that the candidate boundary line does not meet the preset area size condition;

step 23, judging whether an absolute value of a difference between an ordinate of the upper left most corner of the scanned and marked working area and an ordinate of the lower right most corner of the scanned and marked working area is within a preset room width range, if the absolute value of the difference between the ordinate of the upper left most corner of the scanned and marked working area and the ordinate of the lower right most corner of the scanned and marked working area is within the preset room width range, proceeding to step 24, and if the absolute value of the difference between the ordinate of the upper left most corner of the scanned and marked working area and the ordinate of the lower right most corner of the scanned and marked working area is not within the preset room width range, determining that the candidate boundary line does not meet the preset area size condition; and step 24, judging whether an absolute value of a difference between an ordinate of the upper right most corner of the scanned and marked working area and an ordinate of the lower left most corner of the scanned and marked working area is within the preset room width range, if the absolute value of the difference between the ordinate of the upper right most corner of the scanned and marked working area and the ordinate of the lower left most corner of the scanned and marked working area is within the preset room width range, determining that the candidate boundary line meets the preset area size condition, and if the absolute value of the difference between the ordinate of the upper right most corner of the scanned and marked working area and the ordinate of the lower left most corner of the scanned and marked working area is not within the preset room width range, determining that the candidate boundary line does not meet the preset area size condition.

6. The method for dividing the robot area according to claim 1, wherein identifying, after the robot finishes traveling along the boundaries in the preset boundary direction, the door at the position of the reference division boundary line according to image characteristic information of the position of the reference division boundary line acquired by the camera of the robot specifically comprises:

controlling, after the robot finishes traveling along the boundaries in the preset boundary direction, the robot to move to a preset acquisition position in front of the reference division boundary line in the traversed area;

controlling the camera of the robot to acquire an image of the position of the reference division boundary line, and enabling the robot to extract two vertical lines and two horizontal line segments between the two vertical lines from the image, wherein the two vertical lines intersect with the two horizontal lines to define a rectangle; and identifying the door at the reference division boundary line in combination with the two vertical lines and the two horizontal line segments, and marking the reference division boundary line as a position of the door on the laser map.

7. The method for dividing the robot area according to claim 6, wherein identifying the door at the reference division boundary line in combination with the two vertical lines and the two horizontal line segments comprises:

measuring a distance between the preset acquisition position and the reference division boundary line by the laser sensor; and converting, in combination with the distance between the preset acquisition position and the reference division boundary line and by means of a geometric model of camera imaging, heights of vertical line segments cut from the two vertical lines intersecting with the two horizontal line segments into actual heights, and judging whether the actual height is a preset door frame height, if the actual height is the preset door frame height, determining that the two vertical lines and the horizontal line segment arranged over the two vertical lines in a perpendicular manner correspond to a shape of a door frame, so as to determine that the robot identifies the door at the reference division boundary line;

wherein the camera of the robot is arranged obliquely upward, such that when the robot moves to the preset acquisition position in front of the reference division boundary line, a visual angle of the camera of the robot covers an area between the reference division boundary line and a ceiling.

8. A chip, storing a computer program instruction, wherein when the computer program instruction is executed, a method for dividing a robot area based on boundaries is implemented, the method for dividing the robot area comprising:

setting, when the robot travels along the boundaries in a preset boundary direction in an indoor working area, a reference division boundary line according to data scanned by a laser sensor of the robot for dividing the indoor working area, so as to enable the robot to travel along the boundaries in the preset boundary direction according to the reference division boundary line; and identifying, after the robot finishes traveling along the boundaries in the preset boundary direction, a door at a position of the reference division boundary line according to image characteristic information of the position of the reference division boundary line acquired by a camera of the robot, and marking the reference division boundary line on a laser map, so as to divide the indoor working area into different room subareas by means of the door, wherein a condition for the robot to finish traveling along the boundaries in the preset boundary direction is that the robot returns to a boundary starting point after traveling along the boundaries in the preset boundary direction in a traversed area, or the robot cannot set a new reference division boundary line in a process of traveling along the boundaries in the preset boundary direction in the traversed area;

the reference division boundary line divides the indoor working area into the traversed area and an untraversed area, and the traversed area comprises the boundary starting point and traversed paths where the robot travels along the boundaries; and in the process of traveling along the boundaries in the preset boundary direction in the traversed area by the robot, one untraversed area which is new is marked out every time one reference division boundary line is set, and the robot is controlled to continue to travel along the boundaries in the preset boundary direction according to the reference division boundary line.

9. The chip according to claim 8, wherein setting the reference division boundary line according to the data scanned by the laser sensor of the robot in real time specifically comprises:

setting, according to the data scanned by the laser sensor of the robot, a candidate boundary line meeting both a preset boundary width condition and a preset area size condition in the indoor working area, and marking the candidate boundary line as the reference division boundary line on the laser map.

10. The chip according to claim 9, wherein before setting the candidate boundary line meeting both the preset boundary width condition and the preset area size condition in the indoor working area, the method further comprises:

using a seed filling algorithm to carry out filling on the untraversed area of the laser map, so as to fill a contour boundary surrounding the untraversed area, and recording the contour boundary which is filled as the candidate boundary line, wherein a scanning length of the candidate boundary line is a line segment length of the contour boundary which is filled on the laser map processed by means of the seed filling algorithm.

11. The chip according to claim 10, wherein judging whether the candidate boundary line meets the preset boundary width condition comprises:

judging whether a scanning length of the candidate boundary line is greater than a first preset boundary length and less than a second preset boundary length, if the scanning length of the candidate boundary line is greater than the first preset boundary length and less than the second preset boundary length, determining that the candidate boundary line meets the preset boundary width condition, and if the scanning length of the candidate boundary line is not greater than the first preset boundary length and less than the second preset boundary length, determining that the candidate boundary line is not the reference division boundary line.

12. The chip according to claim 10, wherein judging whether the candidate boundary line meets the preset area size condition comprises:

step 21, judging, on the laser map constructed by the robot in real time, whether an absolute value of a difference between an abscissa of an upper left most corner of a scanned and marked working area and an abscissa of a lower right most corner of the scanned and marked working area is within a preset room length range, if the absolute value of the difference between the abscissa of the upper left most corner of the scanned and marked working area and the abscissa of the lower right most corner of the scanned and marked working area is within the preset room length range, proceeding to step 22, and if the absolute value of the difference between the abscissa of the upper left most corner of the scanned and marked working area and the abscissa of the lower right most corner of the scanned and marked working area is not within the preset room length range, determining that the candidate boundary line does not meet the preset area size condition;

step 22, judging whether an absolute value of a difference between an abscissa of an upper right most corner of the scanned and marked working area and an abscissa of a lower left most corner of the scanned and marked working area is within the preset room length range, if the absolute value of the difference between the abscissa of the upper right most corner of the scanned and marked working area and the abscissa of the lower left most corner of the scanned and marked working area is within the preset room length range, proceeding to step 23, and if the absolute value of the difference between the abscissa of the upper right most corner of the scanned and marked working area and the abscissa of the lower left most corner of the scanned and marked working area is not within the preset room length range, determining that the candidate boundary line does not meet the preset area size condition;

step 23, judging whether an absolute value of a difference between an ordinate of the upper left most corner of the scanned and marked working area and an ordinate of the lower right most corner of the scanned and marked working area is within a preset room width range, if the absolute value of the difference between the ordinate of the upper left most corner of the scanned and marked working area and the ordinate of the lower right most corner of the scanned and marked working area is within the preset room width range, proceeding to step 24, and if the absolute value of the difference between the ordinate of the upper left most corner of the scanned and marked working area and the ordinate of the lower right most corner of the scanned and marked working area is not within the preset room width range, determining that the candidate boundary line does not meet the preset area size condition; and step 24, judging whether an absolute value of a difference between an ordinate of the upper right most corner of the scanned and marked working area and an ordinate of the lower left most corner of the scanned and marked working area is within the preset room width range, if the absolute value of the difference between the ordinate of the upper right most corner of the scanned and marked working area and the ordinate of the lower left most corner of the scanned and marked working area is within the preset room width range, determining that the candidate boundary line meets the preset area size condition, and if the absolute value of the difference between the ordinate of the upper right most corner of the scanned and marked working area and the ordinate of the lower left most corner of the scanned and marked working area is not within the preset room width range, determining that the candidate boundary line does not meet the preset area size condition.

13. The chip according to claim 8, wherein identifying, after the robot finishes traveling along the boundaries in the preset boundary direction, the door at the position of the reference division boundary line according to image characteristic information of the position of the reference division boundary line acquired by the camera of the robot specifically comprises:

controlling, after the robot finishes traveling along the boundaries in the preset boundary direction, the robot to move to a preset acquisition position in front of the reference division boundary line in the traversed area;

controlling the camera of the robot to acquire an image of the position of the reference division boundary line, and enabling the robot to extract two vertical lines and two horizontal line segments between the two vertical lines from the image, wherein the two vertical lines intersect with the two horizontal lines to define a rectangle; and identifying the door at the reference division boundary line in combination with the two vertical lines and the two horizontal line segments, and marking the reference division boundary line as a position of the door on the laser map.

14. The chip according to claim 13, wherein identifying the door at the reference division boundary line in combination with the two vertical lines and the two horizontal line segments comprises:

measuring a distance between the preset acquisition position and the reference division boundary line by the laser sensor; and converting, in combination with the distance between the preset acquisition position and the reference division boundary line and by means of a geometric model of camera imaging, heights of vertical line segments cut from the two vertical lines intersecting with the two horizontal line segments into actual heights, and judging whether the actual height is a preset door frame height, if the actual height is the preset door frame height, determining that the two vertical lines and the horizontal line segment arranged over the two vertical lines in a perpendicular manner correspond to a shape of a door frame, so as to determine that the robot identifies the door at the reference division boundary line;

wherein the camera of the robot is arranged obliquely upward, such that when the robot moves to the preset acquisition position in front of the reference division boundary line, a visual angle of the camera of the robot covers an area between the reference division boundary line and a ceiling.

15. A robot, being equipped with a laser sensor and a front camera, wherein the robot is internally provided with the chip of claim 8, so as to implement a method for dividing the robot area based on boundaries by calling the laser sensor and the front camera, the method for dividing the robot area comprising:

setting, when the robot travels along the boundaries in a preset boundary direction in an indoor working area, a reference division boundary line according to data scanned by a laser sensor of the robot for dividing the indoor working area, so as to enable the robot to travel along the boundaries in the preset boundary direction according to the reference division boundary line; and identifying, after the robot finishes traveling along the boundaries in the preset boundary direction, a door at a position of the reference division boundary line according to image characteristic information of the position of the reference division boundary line acquired by a camera of the robot, and marking the reference division boundary line on a laser map, so as to divide the indoor working area into different room subareas by means of the door, wherein a condition for the robot to finish traveling along the boundaries in the preset boundary direction is that the robot returns to a boundary starting point after traveling along the boundaries in the preset boundary direction in a traversed area, or the robot cannot set a new reference division boundary line in a process of traveling along the boundaries in the preset boundary direction in the traversed area;

the reference division boundary line divides the indoor working area into the traversed area and an untraversed area, and the traversed area comprises the boundary starting point and traversed paths v here the robot travels along the boundaries; and in the process of traveling along the boundaries in the preset boundary direction in the traversed area by the robot, one untraversed area which is new is marked out every time one reference division boundary line is set, and the robot is controlled to continue to travel along the boundaries in the preset boundary direction according to the reference division boundary line.

16. The robot according to claim 15, wherein setting the reference division boundary line according to the data scanned by the laser sensor of the robot in real time specifically comprises:

setting, according to the data scanned by the laser sensor of the robot, a candidate boundary line meeting both a preset boundary width condition and a preset area size condition in the indoor working area, and marking the candidate boundary line as the reference division boundary line on the laser map.

17. The robot according to claim 16, wherein before setting the candidate boundary line meeting both the preset boundary width condition and the preset area size condition in the indoor working area, the method further comprises:

using a seed filling algorithm to carry out filling on the untraversed area of the laser map, so as to fill a contour boundary surrounding the untraversed area, and recording the contour boundary which is filled as the candidate boundary line, wherein a scanning length of the candidate boundary line is a line segment length of the contour boundary which is filled on the laser map processed by means of the seed filling algorithm.

* * * * *